United States Patent [19]
Sheldon, Jr.

[11] Patent Number: 4,793,127
[45] Date of Patent: Dec. 27, 1988

[54] SPINDLE MOISTENER PAD FOR A COTTON HARVESTER

[75] Inventor: Donald H. Sheldon, Jr., Des Moines, Iowa

[73] Assignee: Deere & Company, Moline, Ill.

[21] Appl. No.: 174,939

[22] Filed: Mar. 29, 1988

[51] Int. Cl.$^4$ ............................................. A01D 46/08
[52] U.S. Cl. ............................................. 56/41; 56/50
[58] Field of Search ................... 56/28, 33, 41, 50, 44

[56] References Cited

U.S. PATENT DOCUMENTS

| | | | |
|---|---|---|---|
| 2,369,708 | 2/1945 | Baker et al. | 15/127 |
| 2,433,083 | 12/1947 | Baker et al. | 56/41 |
| 3,004,376 | 10/1961 | Hubbard | 56/41 |
| 4,461,140 | 7/1984 | Carui et al. | 56/50 |

OTHER PUBLICATIONS

U.S. patent application Ser. No. 935,459 filed Nov. 26, 1986 by Timothy A. Deutsch et al.

Primary Examiner—John Weiss

[57] ABSTRACT

An improved moistener pad for the moistener column of a cotton picker wherein the edges of the fins which face the direction of approach of the picker spindles are configured with a taper to reduce distortion of the fins, particularly when trash or wrapped cotton is present on the spindles to be wiped. The fin ends are beveled at a forty-five degree angle from the vertical to provide a smooth transition between non-contacting and spindle-contacting conditions.

6 Claims, 1 Drawing Sheet

U.S. Patent    Dec. 27, 1988    4,793,127
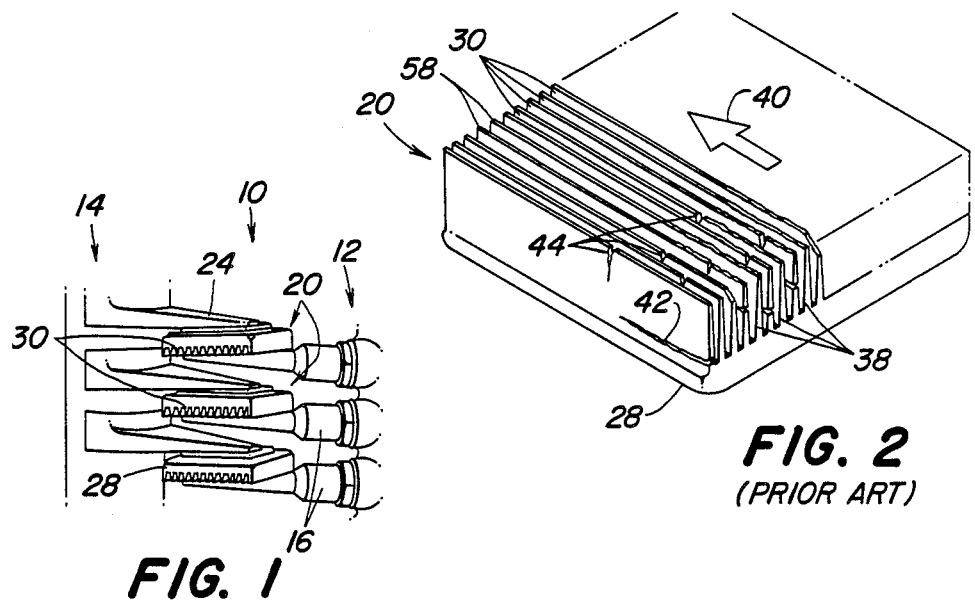
FIG. 1
FIG. 2
(PRIOR ART)
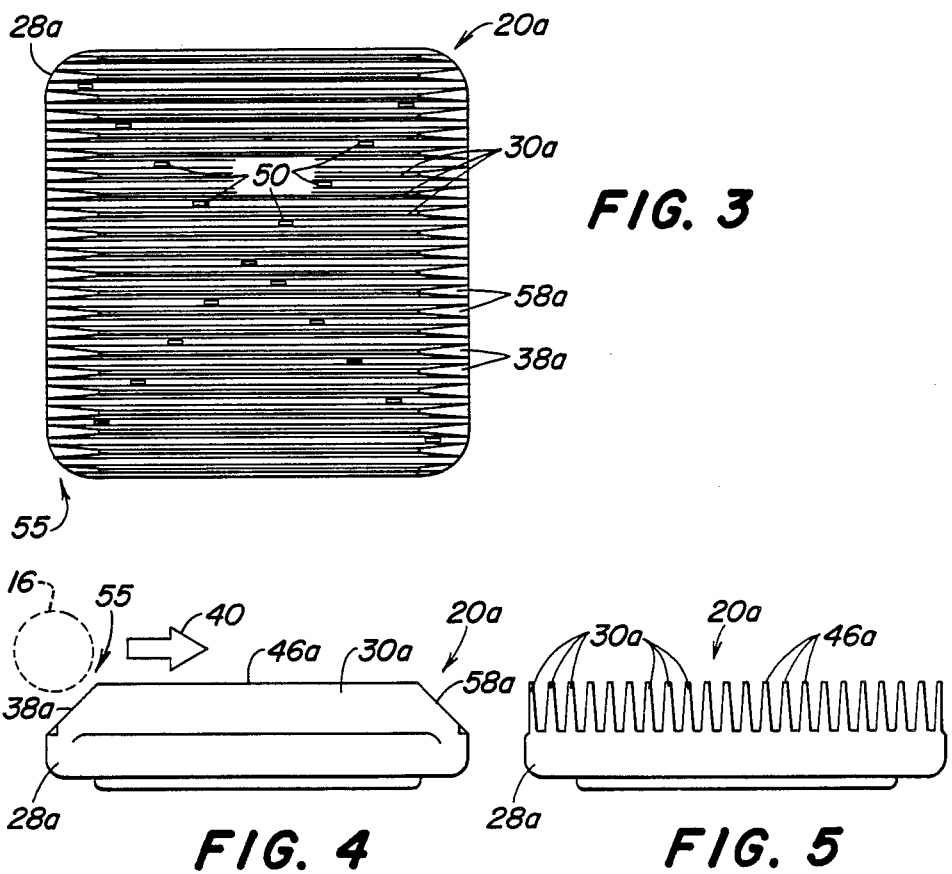
FIG. 3
FIG. 4
FIG. 5

SPINDLE MOISTENER PAD FOR A COTTON HARVESTER

BACKGROUND OF THE INVENTION

The present invention relates generally to cotton harvesters, and more specifically to a moistener pad for the moistener column on a row unit of a cotton picker.

In a conventional cotton picker of the type shown and described in U.S. Pat. No. 4,249,365, spindles which remove cotton from cotton plants travel in a path past a doffing mechanism which removes the cotton from the spindles. These spindles tend to pick up plant juices and trash. To clean the spindles, a moistener column is provided with a plurality of moistener pads supported above the paths of the spindles. The pads include fins which project downwardly to wipe the spindles as they pass the moistener column. Cleaning fluid is applied to the moistener pad to help remove foreign material from the spindles. The moistener column is adjustable vertically so that as the pad fins wear, the pads can be moved into an optimum cleaning relationship with respect to the spindles. A detailed description of such a moistener column is provided in U.S. Pat. No. 3,004,376 issued to A. L. Hubbard on 17 Oct. 1961. A moistener pad of the type utilized with such a column is described in copending U.S. application Ser. No. 935,459 filed 26 Nov. 1986, and of common ownership with the present invention.

Conventional moistener pads, such as shown at FIG. 2 of the drawings herein, often deteriorate and are rendered ineffective before the fins are worn to a point wherein otherwise they could be effectively used for spindle cleaning. Such early deterioration is generally caused by spindles wrapped with trash or cotton passing by the moistener pad. The pads are normally mounted on the moistener column such that the movement of the spindle as it approaches the pad has a substantial component of travel parallel to the length of the fins, and as the spindle with debris engages the generally vertical leading edge of the fins, tearing forces are applied to the fin. As the edge of the fin is pushed by the debris, the fins bend away from their normal parallel, straight relationship. The ends of the fins can tear away from the base of the moistener pad, and the bending of the fin leads to cracking of the fin structure inwardly from the edges. Therefore, the moistener pads have to be replaced before the fins are worn all the way down, particularly when the harvester is operating in marginal crop conditions wherein doffing is not good or wherein trash tends to wrap on the spindles.

It is therefore an object of the present invention to provide an improved moistener pad for a cotton picker moistener assembly. It is yet another object of the present invention to provide a moistener pad which overcomes the above mentioned problems.

It is still a further object of the present invention to provide a moistener pad for a cotton harvester moistener column which reduces the incidence of tearing and cracking of the moistener pad fins and which eliminates the need to replace the pads before the fins have worn completely down.

It is still a further object of the present invention to provide an improved cotton picker moistener pad which reduces stresses, wear and cracking in the pad, even when cotton is wrapped around the spindles to be cleaned or when trash is present on the spindles.

In accordance with the above objects, a moistener pad is provided having a base and a plurality of fins extending vertically from the base in parallel spaced relationship with the leading edges of the fins facing generally in the direction of approach of the spindles. To reduce bending and flexing of fins and tearing and cracking forces as the fins are engaged by a spindle wrapped with cotton or trash, the leading edge of the fins is tapered from the base toward the bottom edges of the fins to provide a less abrupt transition between non-contact and contact of the spindle with the fins as the spindle approaches the moistener pad. The tapered leading edges lie generally along a plane which is angled from the vertical at approximately forty-five degrees. In the preferred embodiment, edges of the fins at both sides of the pad are beveled so that the pad may be mounted with either edge facing in the direction of approach of the spindle.

BRIEF DESCRIPTION OF THE DRAWINGS

FIG. 1 is a perspective view of a portion of a cotton picker drum and moistener column.

FIG. 2 is a perspective view of a moistener pad of the prior art showing the areas of tearing and cracking which typically occur when the pad encounters a wrapped spindle.

FIG. 3 is a top view of the moistener pad of the present invention.

FIG. 4 is a side view of the moistener pad of FIG. 3.

FIG. 5 is an end view of the moistener pad of FIG. 3.

DESCRIPTION OF THE PREFERRED EMBODIMENT

Referring to FIG. 1, there is shown a portion of a cotton harvester row unit 10 including a conventional picker drum 12 and a moistener column 14. The picker drum 12 includes upright columns of spindles 16 which are moved into the path of cotton plants to remove the cotton therefrom. The cotton is then doffed from the spindles 16 by a conventional doffer mechanism (not shown) after which the spindles are rotated under moistener pads 20. Fluid is supplied by the moistener column 14 to the pads 20 to clean plant juices and debris from the spindles 16. Details of the construction and operation of the moistener column 14 may be had by reference to U.S. Pat. No. 3,004,376 incorporated herein by reference for purposes of background information.

The moistener column 14 includes a plurality of pad support arms 24, and the pads 20 each include a base 28 which mounts over the corresponding pad support arm 24 in fluid sealing relationship therewith. A plurality of parallel spaced fins 30 extend vertically from the base into the path of a row of rotating spindles 16. The moistener column 14 is adjustable in the manner described, for example, in the aforementioned U.S. Pat. No. 3,004,376, so that the fins 30 wipe lightly over the surface of the spindle 16. As shown in FIG. 2 (prior art), the leading edges 38 of the fins 30 extend vertically and generally perpendicularly to the base 28 to maximize the amount of fin surface available from the leading edges to trailing edges (38 to 58 of FIG. 2) of the pad 20. As shown in FIG. 1, the picker drum 12 rotates such that the spindles 16 which pass under the pads 20 have a substantial component of movement in a direction parallel to the fins 30, that is, in the direction of the arrow 40 as shown in FIG. 2. (FIGS. 2-5 show the pads inverted from the normal fin-down position of FIG. 1 to more clearly show the fin construction.) Therefore, if any debris such as wrapped cotton or sticks remains on the spindle 16, buckling and tearing forces are applied to the fins 30 as the debris contacts the leading edges 38. This results in the fins 30 prematurely tearing away from the base, such as shown at 42 in FIG. 2, and in vertical cracking of the fins (such as shown at 44) downstream of the leading edges 38. This tearing and cracking often renders the moistener pad 20 unusable before the fins 30 are worn toward the base. Therefore, the pads must be replaced before the full range of wear of the fins is utilized.

An improved pad shown generally at 20a in FIGS. 3-5 includes a base 28a generally of conventional construction and of the type shown and described in the aforementioned co-pending application Ser. No. 935,459. Parallel rows of fins 30a extend vertically from the base and terminate in vertically offset edges 46a which lie generally along a horizontally extending plane (FIGS. 4 and 5). Apertures 50 extend through the base between the fins 30a to provide a fluid communication path between the base 28a and the fins 30a. The general overall structure of the pad 20a is of the type shown and described in the aforementioned U.S. patent application Ser. No. 935,459. However, contrary to the conventional pad design which maximizes fin area, the leading edges 38a are beveled and angle inwardly from the edge of the base 28a to the vertically offset edges 46a. Preferably, the edges 38a lie along a plane which is angled from the vertical approximately forty-five degrees. The tapered edges 38a provide a smoother transition area 55 between the spindle non-contacting and contacting conditions, particularly when wrapped cotton or other trash is present on the spindle 16, to significantly reduce the tearing and bending forces acting on the fins. The tapered transition area 55 provided by the leading edges 38a therefore reduces cracking and tearing to extend the useful life of the pad 20a. As the fins 30a wear and the vertically offset edges 46a more closely approach the base 28a, the moistener column 14 can be lowered to maintain the fins 30a in wiping contact with the spindle 16. As the effective height of the fins 30a decreases with wear, the vertically offset edges 46a will increase in length because of the tapered edges 38a to thereby increase the effective cleaning area of the pad 20a.

In the preferred embodiment, the trailing edges 58a are also tapered in like manner to that of the leading edges 38a. Therefore, the pad 20a may be mounted on the support arm 24 with either edges 38a or 58a facing in the direction of approach of the spindle 16. Also, in the preferred embodiment, the base 28a is generally square in configuration so that the pad 20a may be rotated ninety degrees from the position shown generally in FIG. 1 so that the direction of approach of the spindle 16 is more toward the sides of the fins 30a with a decreased component in the direction of tee edge 38a (or 58a).

In operation, as the spindles 16 approach the pads 20a, the bevel edge 38a (or 58a) of the fins 30a allows a wrapped spindle to enter the pad area with less distortion of the fins. The beveled fin ends provide a smoother transition between the non-contacting and spindle-contacting positions and therefore there is less distortion and shearing action of the fins, resulting in less tearing and cracking of the fins as well as less wear along the vertically offset edges 46a.

Having described the preferred embodiment, it will be apparent that modifications can be made without departing from the scope of the invention as defined in the accompanying claims.

I claim:

1. In a moistener pad for wiping moving spindles of a cotton harvester picking unit, the moistener pad including a base, a plurality of fins extending vertically from the base generally in parallel spaced rows, the fins including leading edges facing generally the direction of approach of the moving spindles and vertically offset edges extending longitudinally from the leading edges, the improvement comprising:

the leading edges of the fins being tapered from the base to the vertically offset edges to thereby provide a tapered transition area between non-contacting and contacting positions of the spindle to reduce distortion and shearing of the fins as the spindle contacts the fins.

2. The invention as set forth in claim 1 wherein the tapered leading edges lie generally along a plane angled from the vertical.

3. The invention as set forth in claim 2 wherein the plane is angled approximately forty-five degrees from the vertical.

4. The invention as set forth in claim 1 wherein the fins include trailing edges extending from the vertically offset edges toward the base, wherein said trailing edges are tapered inwardly from the base to the vertically offset edges.

5. The invention as set forth in claim 4 wherein the moistener pad is generally rectangular in configuration and the leading edges of the fins are the mirror images of the trailing edges of the fins so that the pad may be rotated 180 degrees with respect to the base.

6. The invention as set forth in claim 5 wherein the moistener pad is generally square in configuration and is rotatable in ninety degree increments.

* * * * *